US010085295B2

(12) United States Patent
Skobov et al.

(10) Patent No.: US 10,085,295 B2
(45) Date of Patent: Sep. 25, 2018

(54) DISAMBIGUATION OF TARGET DEVICES USING AMBIENT SIGNAL DATA

(71) Applicant: Microsoft Technology Licensing, LLC, Redmond, WA (US)

(72) Inventors: Mikhail Skobov, Seattle, WA (US); Christopher M. Barth, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/397,238

(22) Filed: Jan. 3, 2017

(65) Prior Publication Data

US 2018/0192446 A1    Jul. 5, 2018

(51) Int. Cl.

| | |
|---|---|
| *H04W 76/11* | (2018.01) |
| *H04W 12/08* | (2009.01) |
| *H04W 64/00* | (2009.01) |
| *H04W 76/02* | (2009.01) |
| *H04W 8/00* | (2009.01) |
| *H04W 76/15* | (2018.01) |

(52) U.S. Cl.
CPC ............ *H04W 76/11* (2018.02); *H04W 8/005* (2013.01); *H04W 12/08* (2013.01); *H04W 64/003* (2013.01); *H04W 76/021* (2013.01); *H04W 76/025* (2013.01); *H04W 76/15* (2018.02)

(58) Field of Classification Search
CPC .......... H04M 1/7253; H04M 2250/06; H04M 1/72527; H04W 12/04; H04W 12/06; H04W 48/16; H04W 76/10; H04W 12/08; H04W 24/00; H04W 28/18; H04W 36/08; H04W 48/12; H04W 48/14; H04W 8/005; H04W 76/11; H04W 76/021; H04W 64/003; H04W 76/025; H04W 76/15
USPC ....... 455/3.06, 410, 411, 456.1, 456.2, 456.3
See application file for complete search history.

(56) References Cited

U.S. PATENT DOCUMENTS

| | | |
|---|---|---|
| 7,676,690 B2 | 3/2010 | Bucher et al. |
| 2008/0010501 A1 | 1/2008 | Bucher et al. |
| 2010/0306394 A1* | 12/2010 | Brown ................ H04L 63/0492 709/229 |
| 2012/0173622 A1 | 7/2012 | Toledano et al. |
| 2014/0176436 A1 | 6/2014 | Raffa et al. |
| 2015/0195601 A1 | 7/2015 | Hahm |

(Continued)

OTHER PUBLICATIONS

Lucero, et al., "Pass-them-around: collaborative use of mobile phones for photo sharing", In Proceedings of the SIGCHI Conference on Human Factors in Computing Systems, May 7, 2011, pp. 1787-1796.

(Continued)

*Primary Examiner* — Philip Sobutka
(74) *Attorney, Agent, or Firm* — Klarquist Sparkman, LLP

(57) ABSTRACT

Techniques are described for automatically determining which of a plurality of target devices should be connected with a source device using data regarding ambient signals about the source device. For example, a request is received for an identifier to which a source device is to connect. Data is received describing at least one ambient signal detected by the source device. The data is compared with a plurality of target device profiles. It is determined that the data matches a target device profile of the plurality of device profiles. An identifier associated with the determined target device profile is returned.

20 Claims, 11 Drawing Sheets

(56) References Cited

U.S. PATENT DOCUMENTS

2015/0378520 A1 12/2015 Chandrasekaran
2016/0239250 A1 8/2016 Kim et al.

OTHER PUBLICATIONS

Wallen, Jack, "How to mirror your Android device on your PC with ease", http://www.techrepublic.com/article/pro-tip-mirror-your-android-device-on-your-pc-with-ease/, Published on: Aug. 28, 2015, 9 pages.
McGill, et al., "Who's the Fairest of Them All: Device Mirroring for the Connected Home", In Proceedings of the ACM International Conference on Interactive Experiences for TV and Online Video, Jun. 3, 2015, pp. 83-92.
McGill, et al., "Mirror, mirror, on the wall: collaborative screen-mirroring for small groups", In Proceedings of the ACM international conference on Interactive experiences for TV and online video, Jun. 25, 2014, pp. 87-94.
"How to use Screen Mirroring function of Smart TV?", http://www.samsung.com/ae/support/skp/faq/1061727, Published on: Nov. 2, 2015, 3 pages.
Suppers, et al., "Casual Mobile Screen Sharing", In Proceedings of the Fifteenth Australasian User Interface Conference, Jan. 20, 2014, pp. 95-96.
Zhang, et al., "Disambiguation of Horizontal Direction for Video Conference Systems", In Proceedings of 7th International Symposium on Visual Computing, Sep. 26, 2011, pp. 1-9.

\* cited by examiner

DISAMBIGUATION OF TARGET DEVICES USING AMBIENT SIGNAL DATA

BACKGROUND

Computing devices are becoming ever more ubiquitous. With the Internet of Things, even basic appliances, such as washing machines and refrigerators, are incorporating processors and software that would not long ago have been considered quite sophisticated. Thus, more and more of people's day to day activities involve computing devices. Increasingly, people desire and need to carry out activities involving, and between, multiple computing devices. For example, a user may wish to display content from a tablet computing device or smartphone on a computer monitor or smart television.

Traditionally, for devices to communicate with each other, they were required to detect and pair with one another. For example, devices using the Bluetooth® standard are able to automatically sense one another, and pair, after a user carries out an initial pairing step. However, existing methods for pairing devices can require significant user interaction, may have specific hardware requirements or limitations, and may not be able to adequately determine which devices should be paired when multiple candidates exist. Thus, there is room for improvement in technologies related to automated recognition and selection.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for selecting an intended target device to be connected to a source device by analyzing ambient signals detectable by the source device. Thus, the source and target devices can be connected without requiring manual intervention, a specific paring step between the source and target devices, and without the use of specialized hardware. For instance, the ambient signals detected by the source device can be those detectable by hardware components included in typical configurations of the particular source device. Thus, performing activities, and executing code, involving multiple devices can be facilitated.

For example, a method can be provided for determining the identity of a target device to connect with a source device. The method can include receiving a request for an identifier of a target device to which the source device is to connect. Data is received describing at least one ambient signal detected by the source device. The data is compared with a plurality of target device profiles. It is determined that the data matches a target device profile of the plurality of target device profiles, the target device profile corresponding to the target device. An identifier, associated with the target device and the determined target device profile, is returned.

As another example, a method can be provided for creating a target device profile to be used in a disambiguation process involving a plurality of target devices. A request to register a target device is received. Data describing at least one ambient signal detected by the source device is received. The data is associated with a target device identifier. The data is stored in association with the target device identifier.

As another example, a method can be provided for obtaining a target device identifier for use in connecting a source device with a target device associated with the target device identifier. A request for a target device identifier is generated. At least one ambient signal is detected. The request and data describing the at least one ambient signal are sent to a disambiguation component. A target device identifier is received from the disambiguation component.

The present disclosure also includes computing systems and computer readable storage media configured to carry out, or including instructions for carrying out, an above-described method. As described herein, a variety of other features and advantages can be incorporated into the technologies as desired.

DETAILED DESCRIPTION

Overview

Figure 1:
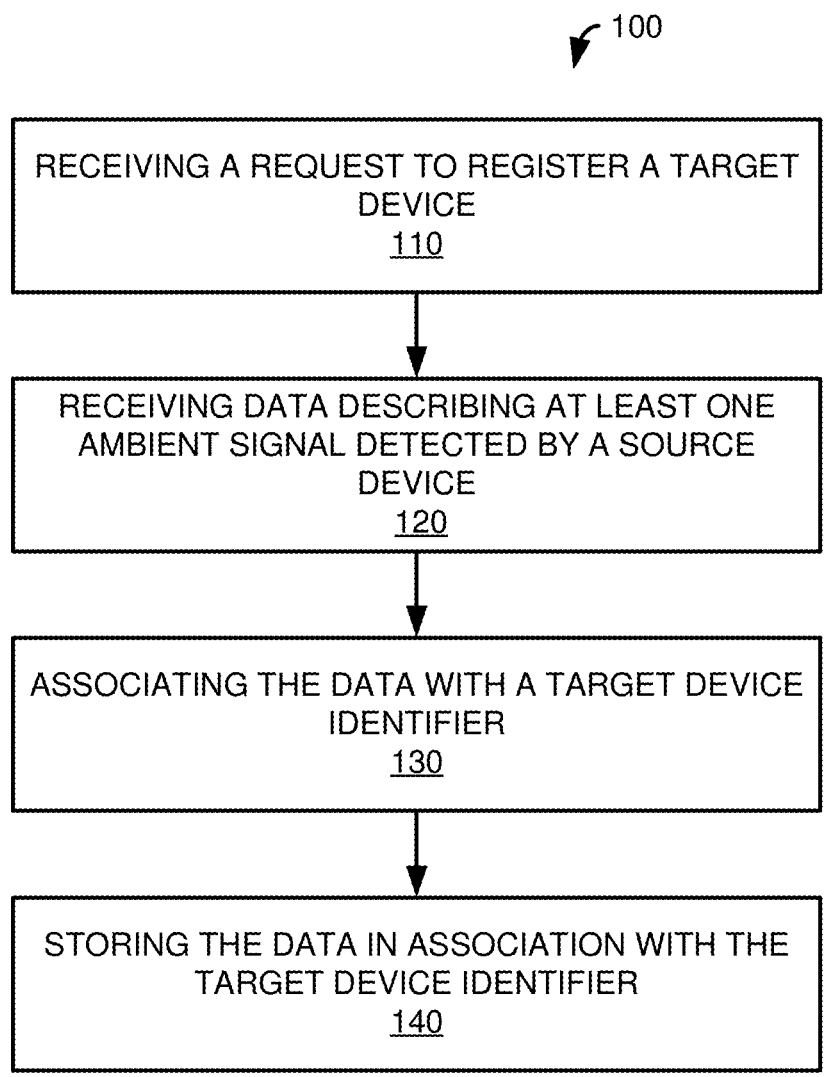
FIG. 1 is a flowchart of an example method for registering a target device.

Computing devices are becoming ever more ubiquitous. With the Internet of Things, even basic appliances, such as washing machines and refrigerators, are incorporating processors and software that would not long ago have been considered quite sophisticated. Thus, more and more of people's day to day activities involve computing devices. Increasingly, people desire and need to carry out activities that involve multiple computing devices. For example, a user may wish to display content from a tablet computing device or smartphone on a computer monitor or smart television.

Generally, the present disclosure relates to the sending of data between a source device and a target device. In at least some cases, a source device can be a mobile device and a target device can be a physically static device. A mobile device can be a device that is intended or designed to be frequently or easily moved between locations. Mobile devices can be, but are not required to be, handheld devices. Mobile devices can be general purpose computing devices, or can be special purpose computing devices, including with program logic embodied in firmware or hardware.

Examples of mobile computing devices include, without limitation, smartphones, feature phones, tablet computing devices, laptop computers, media players, content streaming device (e.g., devices configured to obtain audio or video content over a network and provide the content to another device, such as a physically static device), smart watches, wearable technologies (e.g., smart glasses or fitness devices), virtual reality accessories (including VR headsets and haptic devices), computer peripherals (e.g., printers), gaming accessories (e.g., game controllers or auxiliary display devices), presentation accessories (e.g., smart whiteboards or video projectors), and remote control units (e.g., "universal" remote controls or remote controls for one, or one or more, individual devices). An example of a mobile device that is not handheld is a computing device associated with an automobile.

As used herein, a static (physical static) device is a device that is generally intended to be left in place for a significant period of time, including during operation of the device. While some physically static devices may not be handheld, or easily portable, other physically static devices can be handheld or easily portable. Physically static devices can include general purpose or special purpose computing devices, including with program logic embodiment in firmware or hardware. Examples of static devices include, without limitation, smart televisions, monitors, desktop computers, content streaming devices, game consoles and similar devices, home automation systems and devices (e.g., smart thermostats, smart door locks, smart lighting, and the like), and appliances (e.g., washers, dryers, ovens, refrigerators, and the like).

Although generally described as being used to facilitate communication between static devices and mobile devices, it some cases the present disclosure can be used to facilitate communication between mobile devices, between static devices, or between various combinations of mobile and static devices. For example, if a new static device is to be installed, placed, or otherwise used in a location, it can be placed in communication with other static devices in the location using the teachings of the present disclosure.

Traditionally, for devices to communicate with one another, they were typically required to detect and pair with one another. For example, devices using the Bluetooth standard are able to automatically sense one another, and pair, after a user carries out an initial pairing or registration step. However, existing methods for pairing devices can require significant user interaction, may have specific hardware requirements or limitations, and may not be able to adequately determine which devices should be paired when multiple candidates exist. For instance, when a mobile device is brought within range of multiple Bluetooth enabled devices, the mobile device may not pair with the correct device. If the wrong device is initially paired, a user (or a computing device, in some scenarios) would need to unpair the incorrect device, locate the correct device, and manually pair the correct device.

As an example, a household may have multiple game consoles, and one or more game controllers useable with the consoles. An individual may wish to use the game controller with a game console in the living room of their house, but the game controller may be paired with a game console located in the individual's bedroom. In order to use the game controller with the living room console, the user may need to physically connect the game controller with the living room console before it can be used. This process can be disruptive and time consuming. Thus, there is room for improvement in technologies related to automated device detection and connection.

Generally, the present disclosure provides improvements in disambiguating multiple candidate target devices for a source device. As used herein, a source device refers to a device that is to communicate with a target device. The source device is used to determine the identity of the target device. A target device is the device with which the source device is to connect.

The disambiguation process can use ambient signals about the source device. Ambient signals, as used herein, refers to signals that are detectable in an environment about a current location of a source device. Ambient signals can include electronic signals (e.g., GPS signals, Bluetooth signals, or signals from wireless access points), as well as signals generated by sensors (e.g., hardware sensors) located on the source device (and typically producing data based on the position or surroundings of the source device), such as light sensors, microphones, magnetometers, or gyroscopes. In some aspects, ambient signals can include other types of signals. In particular implementations, at least one ambient signal detectable by a source device, and used in a disambiguation method, is not a signal used to send data between the source device and a target device.

In some cases, communication can be initiated by the source device, and in other cases by the target device. Being a "source" device does not necessarily mean that the source device will send, or predominately send, data to the target device, or vice versa. For example, in some cases, a user may wish to stream content from one of multiple target deices (e.g., physically static devices) to a source device (e.g., a mobile device).

Rather than polling potential target devices, or detecting identifiers broadcast by target devices, the disclosed technique uses ambient signals proximate the source device to determine (in some cases, at least in part) the intended target device. The candidate target devices can be registered with, and information useable to identify the candidate devices stored in, a library or database. The registration process can include detecting ambient signals proximate the source device or the target device. In some cases, the information in the library can be obtained using the source device. In other cases, the information in the library can be obtained using a different device, which can be of the same type as the source device or of a different type. In particular examples, all or a portion of the library can be accessed by multiple users.

When the source device is to be connected to a target device, the source device detects data regarding ambient signals proximate the source device. The ambient signals are compared with the library or database. If the signals can be used to disambiguate the desired target device, the source and target devices can be connected. For example, the device identifier, or other information useable to connect the source and target devices, can be returned to a calling function or application (e.g., an application program interface). If the appropriate target device is not disambiguated, or is not present in the library, additional steps may be taken (e.g., prompting a user to select the appropriate target device or register the target device with the library).

The present disclosure can provide a number of advantages. For example, the present disclosure can allow a source device to be connected to the appropriate target device without requiring a specific pairing step, such as a manual pairing step. The present disclosure can also allow source and target devices to be paired without requiring specific hardware or defined software specifications (e.g., mutually useable identifiers, or the ability to send or receive identifiers). The disclosed techniques can use available signals and sensors to carry out the disambiguation. Thus, the technique can automatically be adapted to the specific capabilities of the source device.

Target Device Registration

FIG. 1 provides a flowchart of an example method 100 for registering a target device, such as to generate a profile for a target device and store the profile in a library or database. At 110, a request is received to register a target device. For example, the request may be received through an application program interface or a local method call. At 120, data is received describing at least one ambient signal detected by a source device. In particular cases, 120 can include receiving data describing multiple ambient signals detected by the source device, such as ambient signals having a variety of source types.

At 130, the data is associated with a target device identifier. The data is stored in association with the target device identifier, such as in a library or database, at 140.

Target Device Disambiguation

Figure 2:
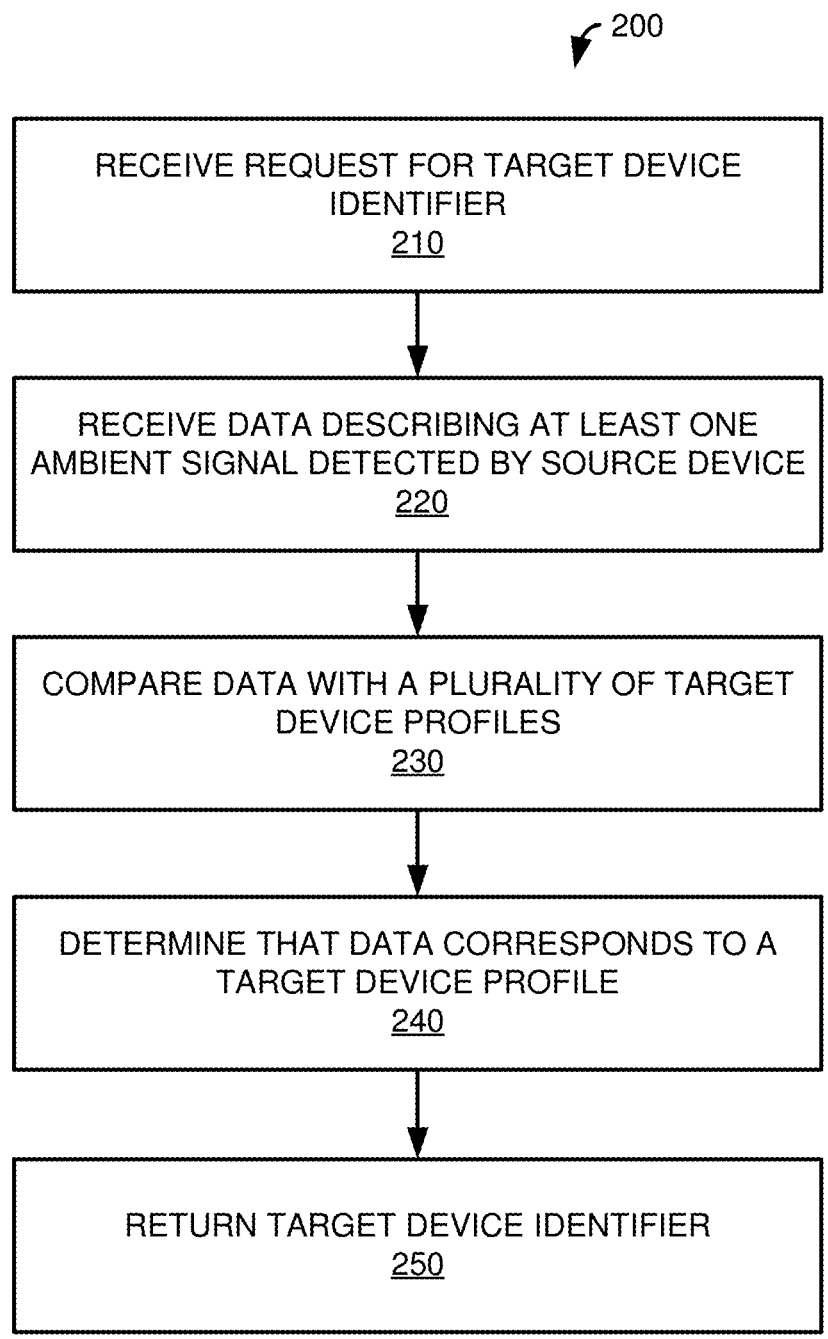
FIG. 2 is a flowchart of an example target device disambiguation method.

FIG. 2 provides a flowchart of a method 200 for disambiguating a plurality of target devices to determine a target device to which a source device is intended to be connected. At 210, a request is received for a target device identifier. For example, the request can be received through an application program interface or a local method call. At 220, data is received describing at least one ambient signal detected by the source device.

The data is compared with a plurality of target device profiles at 230. Each target device profile can include a target device identifier and data describing at least one ambient signal that should be detectable by the source device if the target device is the intended target device. At 240, it is determined that the data corresponds to a target device profile. The target device identifier associated with the determined target device profile is returned at 250.

Request for Target Device Identifier

Figure 3:
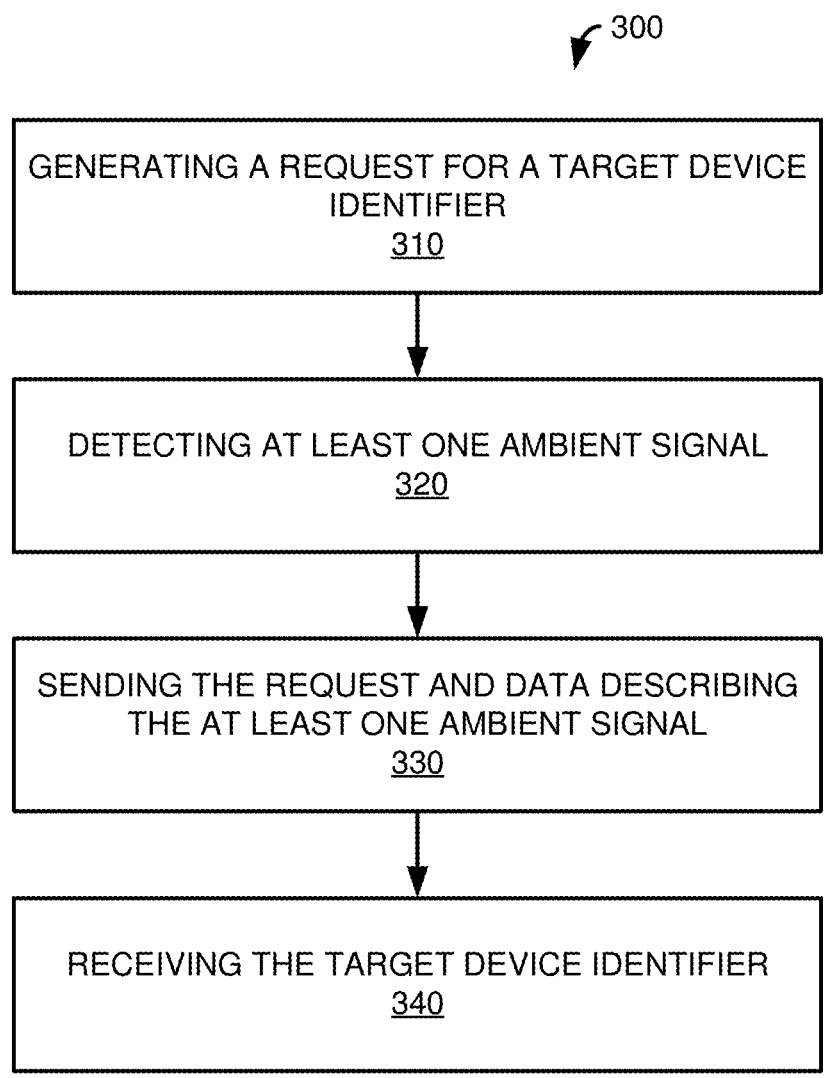
FIG. 3 is a flowchart of an example method for requesting and receiving a target device identifier from a disambiguation process.

FIG. 3 provides a flowchart of a method 300 for requesting and receiving a target device identifier, such for communicating data between a source device and an intended target device. At 310, a request is generated for a target device identifier. At least one ambient signal is detected by the source device at 320. The request, and data describing the at least one ambient signal, is sent, such as to a disambiguation component (e.g., a software component, module, library, etc.) implementing the method 200 of FIG. 2. In a particular example, the request and data can be sent in association with an application program interface call, or a call to a local method. The target device identifier is received at 340.

Environment with Source Device and Multiple Candidate Target Devices

Figure 4:
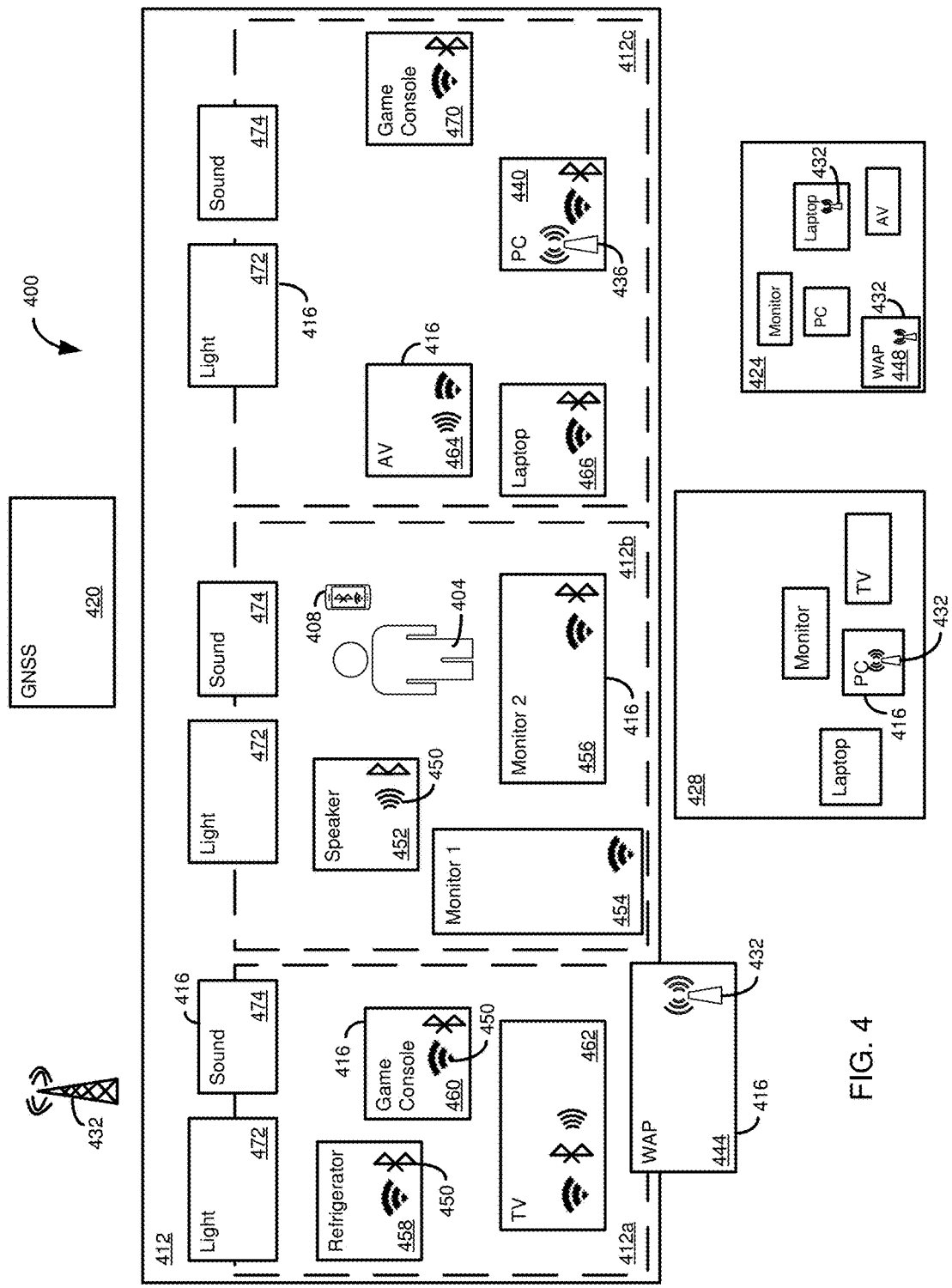
FIG. 4 is a diagram illustrating an example environment having a source device, multiple candidate target devices, and multiple ambient signal sources.

FIG. 4 illustrates an example environment 400 in which the disclosed innovations can be employed. The environment 400 can include a user 404 having a source device 408, such as a smartphone. Although the environment 400 is shown as including the user 404, in at least some implementations, the innovations can be carried out using the source device 408 without the presence of, or affirmative action by, a user.

The user 404 and source device 408 are at a location 412 surrounded by a plurality of ambient signal sources 416. The ambient signal sources 416 can have various types. Different types of ambient signal sources 416 can provide differing degrees of location information, including location accuracy, and can originate at varying distances from the source device 408. Any particular environment (or location therein) 400 can include one or more of the ambient signal sources 416, but need not include any specific number or type of ambient signal sources. The technique can use the ambient signals sources 416 present around the source device 408 that are detectable by the source device. In addition, for any particular type of ambient signal source 416, one or more of that type of source may be included (detectable) in the environment 400.

One type of ambient signal source 416 can be a long distance signal source, such as a global navigation satellite system (GNSS) 420 (e.g., the NAVISTAR Global Positioning System), or similar location service. The GNSS system 420 can be useful for providing a general indication of the location of the source device 408, and therefore a high level indication of the location of the source device 408. Depending on the specific GNSS system 420, the receiver of the source device 408, and environmental conditions, typical consumer devices can have a horizontal positional accuracy of between about 6 feet and about 30 feet, although the precision can be lower when used indoors. However, the present disclosure can incorporate GNSS systems 420 and source devices 408 having greater positional accuracy.

The GNSS system 420 may be used to determine whether the source device 408 is in the location 412 or a location 424 relatively distant from the location 412. The GNSS system 420 may also be able to distinguish between the location 412 and a location 428 relatively close to the location 412. However, the GNSS system 420 may not be able to determine the exact location of the source device 408 within the location 412. For example, the location 412 may have sublocations (e.g., individual rooms of a house, or room or office of a work location) 412a, 412b, 412c. The accuracy of the GNSS system 420 may not be sufficient to distinguish between all or a portion of the sublocations 412a, 412b, 412c. Or, even if data associated with the GNSS system 420 is sufficient to locate the source device 408 within the correct sublocation 412a, 412b, 412c, it may not be accurate enough to determine the position and orientation of the source device within the sublocation.

Intermediate range signal sources can also be used to help determine the position of the source device 408, and disambiguate candidate target devices. Intermediate range signals can include signal sources 432, such as cellular communication antennas or wireless access points (WAPs). In many locations, including home and work locations, a plurality of intermediate range signals may be detectable by the source device 408.

For example, if location 412 is a user's home, WAP access point 436, associated with a personal computer 440, may be the closest and/or strongest WAP signal detectable by the source device 408. However, the source device 408 may also be able to detect a WAP 444, which can be, for example, a WAP located in a neighbor's home. The source device 408, when in the location 412, may not be able to detect a WAP 448 located, for example, at the place of work 424 of the user 404. Thus, when target devices are to be disambiguated, the detection of the WAPs 436 and 444 (and, optionally, the lack of detection of WAP 448), can be used to help determine the position of the source device 408 to be in location 412.

The strength of a WAP, or other intermediate range ambient signal sources 432 detectable by the source device 408, can depend on its proximity to the source device, as well as the signal path between the source device and the intermediate range ambient signal source (e.g., whether walls or other obstructions are placed between them). Thus, the strength of the WAPs 436 and 444, for example, can be used to help determine a sublocation 412a, 412b, 412c of the source device 408, and thus disambiguate candidate target devices. That is, a stronger signal from WAP 444, or weaker signal from WAP 436, can indicate that the target device is in sublocation 412a, while a stronger signal from WAP 436, or a weaker signal from WAP 444, can indicate that the target device is in location 412c.

When multiple WAPs (or other suitable types of ambient signal sources) are available, in addition to using the presence or absence of a particular WAP (or its signal strength) to disambiguate candidate target devices, the WAPs can be used to triangulate a location of the source device 408. Such triangulation can be used in place of, or in addition to, coordinates of the source device 408 obtained by other methods (including the GNSS system 420). For instance, the location of the source device 408 provided by many types of consumer-grade GNSS receivers, one of which may be used in the source device, may not be sufficiently precise to provide a location within a desired degree of specificity. Combining data from the GNSS system 420 with other data, such as triangulation using WAPs (or other types of intermediate range ambient signal sources 432), can provide location information with a higher degree of precision.

Shorter range signal sources 450, such as signals emanating from electronic devices proximate the source device 408 (e.g., devices using WI-FI, Bluetooth, or near-field communication), can also be used to help determine the position of the source device and disambiguate candidate target devices. At least a portion of the electronic devices can be candidate target devices. Other electronic devices can produce signals which can be used to determine the position of the source device 408 (and disambiguate candidate target devices), but need not be devices to which the source device 408 may attempt to connect, or even devices to which the source device is capable of connecting.

As shown in FIG. 4, the source device 408, in sublocation 412b, is surrounded by a speaker 452, a first monitor 454, and a second monitor 456. Other sublocations can include electronic devices. Sublocation 412a includes a refrigerator 458, a game console 460, and a television 462. Sublocation 412c includes an audio/video device 464 (e.g., a projector or a smart whiteboard), a laptop computer 466, the personal computer 440, and a game console 470. During disambiguation, the detection of signals (e.g., Bluetooth, near-field communication, or WI-FI signals) from the devices 452, 454, 456 (and their relative strengths) and, optionally, the lack of detection (or weakly detected signals from) the electronic devices of sublocations 412a and 412c can help establish the position (including, potentially the position of the source device relative to the devices 452, 454, 456) of the source device 408.

Other types of ambient signals can be obtained at a particular location or sublocation. For example, each sublocation 412a, 412b, 412c can have various light sources (e.g., sunlight, artificial lighting, or lighting from electronic devices in proximity to the source device 408). Similarly, sound (including the lack of audible signals) in and around a location or sublocation can be used to identify the location or sublocation, and potentially the position of the source device therein. The light and sound can provide a light profile 472 and a sound profile 474.

In some cases, the light profile 472 and the sound profile 474 can vary over time, such as changing during the course of a day, or depending on the day (e.g., having different characteristics on a weekday versus a weekend). Even within a sublocation, the light profile 472 and sound profile 474 can vary. For example, certain areas of a room may be lighter or darker than others, or have a different color profile. Thus, the light profile 472 and sound profile 474 can be used to help determine (or confirm) the location and sublocation of the source device 408, including a more precise location and orientation within the location or sublocation.

The previously described ambient signal sources 416 can be used to help determine a general location for a source device 408, as well as more precise location and positional information (e.g., the orientation of the source device). At least certain source devices 408 can include sensors that provide information that can be used to help determine the position of the source device. For example, the source device 408 can include a magnetometer, which can be used to determine a direction the source device in facing or pointing. The source device 408 can include a gyroscope, which can be used to determine an angular position, or tilt of the source device.

As will be further described, the ambient signal sources 416 (including information from a magnetometer, gyroscope, or similar sensor of the source device 408) can be used to register target devices with a library or database for future use in a disambiguation process associated with the source device 408 or another source device. For example, the source device 408 can be held at, or near, a location where the user 404 (or another user) may intend to later use the source device in association with a particular target device.

Data describing the ambient signal sources 416 can be recorded, such as by the source device 408 (or, in other cases, another device, which can of the same or different type than the source device). In order to provide additional disambiguation data, the source device 408 (or other device) can record a photograph or image of the surroundings of the source device (e.g., any logos visible, walls colors, furniture, device form factors identifiable in the image) during the registration process. If multiple candidate target devices (for instance, multiple monitors) are in an image frame, the image can be used to help provide their relative positions. Particularly if a location and/or orientation of the source device 408, and target device, are not determined to a desired degree of confidence using other ambient signal sources 416, an image or photo can be acquired by the source device and compared with the previously stored image, such as using various image recognition techniques.

The ambient signal sources 416 can be used during a disambiguation process to determine a target device (or narrow down a list of candidate target devices) that is to be connected with the source device 408. For example, signals detected by the source device 408 can be compared with a library to try and determine whether a particular target device can be identified. In some cases, all of the available ambient signal sources 416 can be used (e.g., measured by the source device 408 and compared with the library), in other cases, certain ambient signal sources 416 (e.g., GNSS system 420 or intermediate range ambient signal sources 432) can be used to try and determine the target device. If multiple candidate target devices cannot be disambiguated based on the analyzed or measured signals, additional signals can be used in the analysis (and, if not already acquired, acquired). An image of the location can be compared with a library image if the target device still cannot be disambiguated.

When ambient signal sources 416 are analyzed in an order, the order can be selected based on a number of factors. Typically, ambient signal sources 416 are desired that allow for the identity of a target device to be determined in the most efficient manner, which can include both time efficiency (e.g., returning the identity of the target device in the shortest time) and resource efficiency (e.g., conserving network, processor, or battery use). For example, image processing may be computationally expensive, and thus, in at least some cases, is only used when a target device cannot be determined using data that can be simply measured by the source device 408.

Ambient Sensor and Program Interface Architecture

Figure 5:
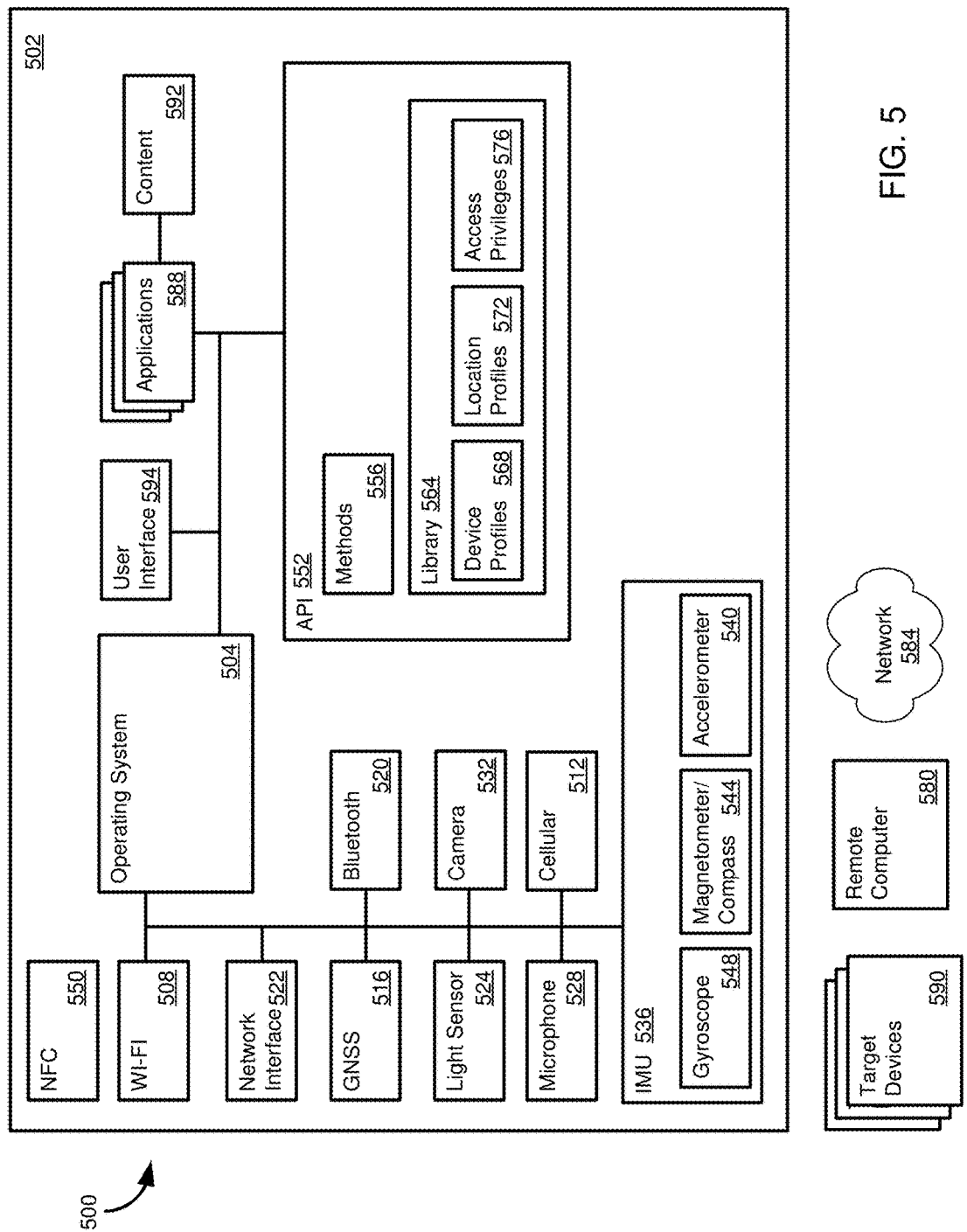
FIG. 5 is diagram of an example architecture in which the described innovations can be implemented.

FIG. 5 presents a diagram of an example architecture 500 that can be used in implementing one or more of the disclosed innovations. The architecture 500 can include a source device 502 having an operating system 504 that provides an interface to various hardware or software components that can provide information regarding ambient signal sources (e.g., the ambient signal sources 416 of FIG. 4) that can be used to determine the position (including location and, optionally, orientation) of a source device. For example, the operating system 504 can be in communication with a WI-FI component 508, which can include, or be coupled to, a WI-FI antenna. The WI-FI component 508 can be used to detect WAPs, as well send and receive data. Similarly, the source device 502 can include a cellular component 512, a GNSS component 516, and a Bluetooth (and/or nearfield communication component) component 520 which can be used, respectively, to detect cellular networks, GNSS coordinates, and Bluetooth enabled devices, and to send and receive information therewith. The components 512, 516, 520 can be coupled to respective hardware antennas to transmit and/or receive data or detect signals.

The operating system 504 can communicate with a network interface component 522, which can also communicate, in at least some cases, with the WI-FI component 508, the cellular component 512, or the Bluetooth component 520, in order to facilitate communication with other devices over a network, such as using the TCP/IP protocols.

The source device 502 can also include a light sensor 524 and a microphone 528, which can be used to detect the light intensity in the vicinity of a source device (and, in at least in some cases, a color profile) and sounds detectable in the environment of the source device. The light sensor 524 can be a sensor normally used, for example, to adjust the brightness of a display associated with the source device. At least certain source devices can be equipped with a camera 532 (including, in some cases, a depth camera). The camera 532 can be used to obtain a photo or image of the environment of the source device, and, optionally, such as when a separate light sensor 524 is not included in a source device, to obtain information useable to obtain light intensity or color data from an area proximate the source device. The camera 532, microphone 528, and light sensor 524 can also be in communication with the operating system 504.

The operating system 504 can be in communication with an inertial measurement unit (IMU) 536 of the source device 502. The IMU 536 can include various sensors for determining the position of a source device, including an accelerometer 540, a magnetometer 544, and a gyroscope 548. In particular, as discussed above, the magnetometer 544 may be used to determine the orientation of the source device about a vertical axis (e.g., a compass direction), and the gyroscope 548 may be used to determine the orientation (e.g., tilt) of the source device about a horizontal axis. Although shown as part of the IMU 536, in other cases, one or more of the accelerometer 540, magnetometer 544, and gyroscope 548 can be included in the architecture 500 as discrete components. The source device 502 can include more, fewer, or different sensor components than shown (and in, some cases, can include a near-field communication component 550.)

In a particular example, one or more of the disclosed innovations can be implemented in a library accessible by an application program interface (API) 552 or another component operating a disambiguation component (e.g., software carrying out the method 200 of FIG. 2). The API 552 can include methods 556, such as methods for registering a target device and methods for determining the position of a source device/disambiguating target devices. During execution of the methods 556, the methods can access a library 564. The library 564 can include stored device profiles 568 (e.g. ambient signal information detected during registration of a target device), stored location profiles 572 (e.g. ambient signal information associated with particular locations), and access privileges 576 associated with target devices. In some cases, access privileges can be stored with the device profiles 568.

Although the API 552, and its associated components, is shown as part of the source device 502, the architecture 500 can be arranged differently. For example, the API 552 can be located remotely from the source device, such as at a remote computer 580 over a network 584 (including in cloud computing implementations). Although shown as part of the API 552, the library 564 can be a separate component from the API 552, and can be stored at the same location as the API, or at another, remote location (e.g., the remote computer 580). For example, in some cases, the library 564 can be shared by multiple users and/or multiple source devices. In other cases, the library 564 can be configured for use by a single user or source device.

The API 552 can be accessed by one or more applications 588. The applications 588 can be executed on the source device 502 in some cases. In other cases, at least a portion of an application 588 may be executed remotely (e.g., at the remote computer 580). The applications 588 can call the methods 556 to register target devices 590 or determine the location of the source device/disambiguate target devices. In a particular implementation, a method 556 can return a device identifier for the disambiguated target device 590 to an application 588, which the application can then use to communicate with the target device. While not limited to any specific use case (e.g., type or purpose of communication with a target device), in some cases, a source device 502 can provide content 592 to the target device 590. Content 592 can include audio or video content, including transmitting information stored or displayed on the source device to be displayed or executed on the target device.

The source device 502 can communicate with external computing devices, including the target devices 590 and the remote computer 580, such as using the network interface 522. The remote computer 580 can be used, for example, to execute all or a portion of applications 588 of the source device 502 using the API 552, or may host all or a portion of the functionality of the API, including the library 564. The source device 502 can communicate with the target devices 590 and the remote computer 580 directly, or through the network 584 (e.g., in a cloud computing environment or over the Internet).

The operating system 504 can communicate with, or provide, a user interface 594. The user interface 594 can be used to display information to a user (such as through a display of the source device 502) or receive input from a user, such as taps, finger gestures, clicks, and pointer device input. For example, a user may choose to register a target device, or send data to a target device, by pointing the source device at the target device and making a flicking motion on a touchscreen (or making a similar motion with a pointing device).

The architecture 500 can include more or fewer components than shown, and may be organized in other manners. For example, functionality of a particular component can be carried out by another component. In addition, in at least some cases, functionality can be carried out using multiple components. Including as described above, at least certain functionality shown as occurring at the source device 502 can be carried out by the remote computer 580 (or multiple remote computers, including a remote computer and a cloud computing system). All or a portion of the functionality of the API 552 may be carried out by an application 588, and the API and application can both be located at the source device 502 or remote computer 580, or one of the API and application can be located at the source device and the other can be located at the remote computer.

User Interface Screen

Figure 6:
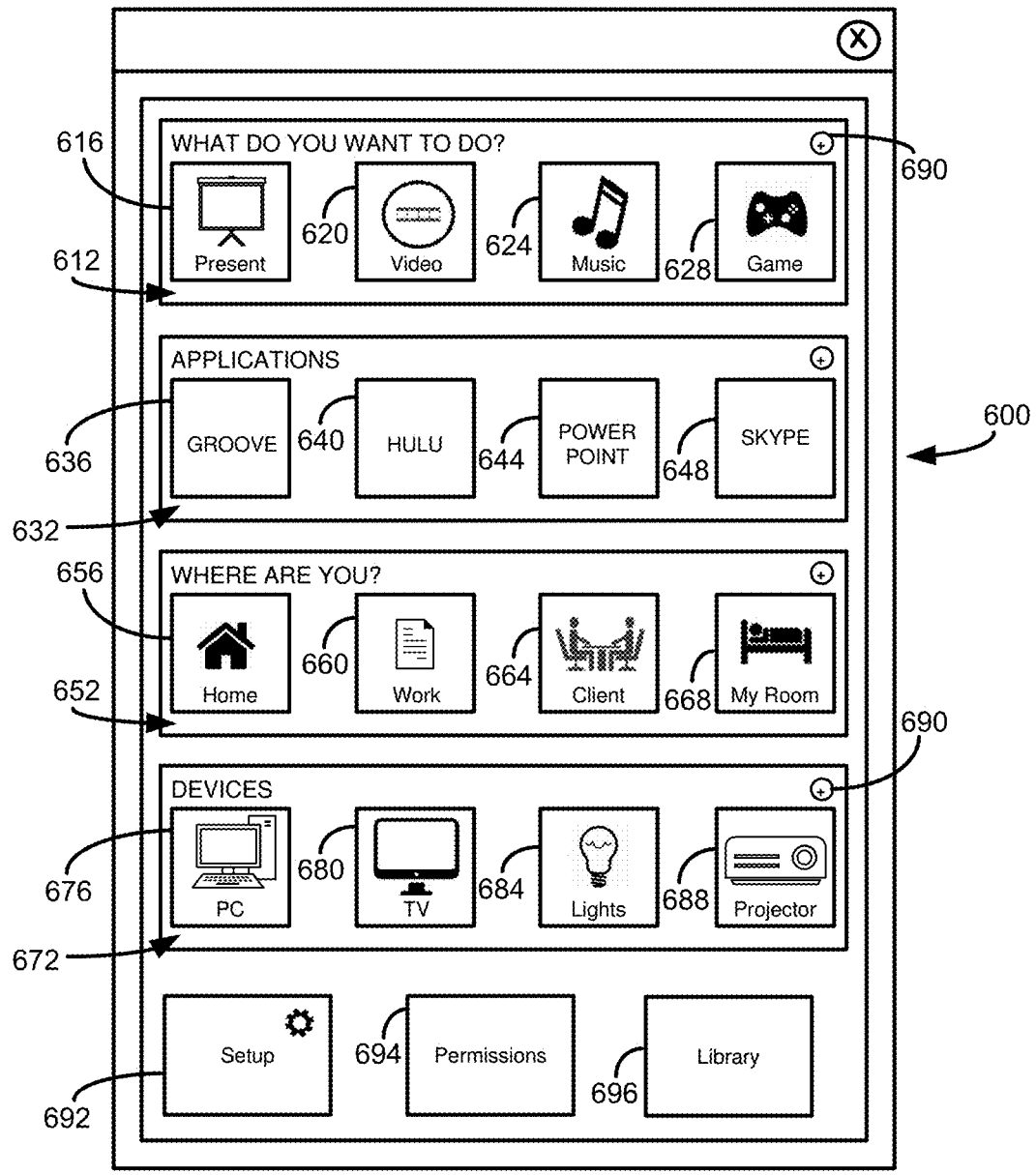
FIG. 6 is an example screen allowing a user to carry out a described disambiguation method to connect a source device with a target device.

FIG. 6 presents an example screen 600 that may be presented to a user, such as using the user interface 594 of FIG. 5, to carry out one or more of the disclosed innovations. The screen 600 may provide a user with a list 612 of activities that a user may wish to conduct. Selection of an activity from the list 612 can be used to help determine which target device may be intended to connect with a source device in order to carry out the selected activity. That is, the activity selected from the list 612 may act as a filter to narrow down potential locations of the source device, or candidate target devices to be disambiguated.

The activity selected from the list 612 may also be used to determine an application, or a list of possible applications, such as an application list 632, that a user may wish to execute in order to carry out the activity. For example, the screen 600 illustrates a "present" icon 616, which can be selected if the user wishes to present content, such as a presentation, to other individuals. Selection of the "present" icon 616 may filter the user's location to those associated with the user's place of work, and candidate target devices (and optionally sublocations) as those likely to be associated with presenting to a group. The position of the device, candidate target devices, and identity of the target device can be determined with reference to ambient signals detected by the source device. Other icons a user can select, providing example of other activities a user may wish to conduct, include a "video" icon 620 (such as to stream video from or through the source device to the target device), a "music" icon 624 (such as to stream music from or through the source device to the target device), or a "game" icon 628 (such as to use the source device to control a game operated by the target device, or to execute the game in conjunction with the target device (e.g., displaying a portion of the game on the source device and a portion of the game on the target device)).

Similarly, the screen 600 can display the list 632 for various software applications that can use the disclosed innovations. In addition to accessing the application, selection of an icon from the list 632 can filter locations and/or candidate target devices during candidate target device disambiguation. As examples of applications that can be selected by a user, a GROOVE icon 636 can be selected to stream music using the GROOVE service of Microsoft Corp. of Redmond, Wash. A HULU icon 640 can be selected to stream video using the HULU service of HULU, LLC, of Santa Monica, Calif. A POWERPOINT icon 644 can be selected to stream a presentation to a target device using the POWERPOINT software of Microsoft Corp. of Redmond, Wash. Presentations, or individual or group meetings or conversations, can be streamed from or through the source device to a target device by selecting the SKYPE (Microsoft Corp., Redmond, Wash.) icon 648.

A list 652 of location icons can allow a user to indicate the current location of the source device, which can limit target devices to those at the selected location. Locations in the list 652 can include more granular locations, such as "home" icon 656, "work" icon 660, or "client" icon 664 (e.g., a client often visited by the user, and at which they may make presentations), or more granular or specific locations, such as "my room" icon 668.

A list 672 of device icons can be provided to allow a user to select a category of target devices with which they desire to connect. The category selected from the list 672 can be used to narrow down the list of candidate target devices, and in some cases to help determine the location of the source device (e.g., in some cases some locations will not include certain kinds of devices, such as a work location not including a game console). Examples of target device categories include "personal computers" icon 676, "television" (or monitors) icon 680, "lights" icon 684 (e.g., for home automation devices), and "projector" icon 688.

When presented on a touch screen enabled device, a user may be able to bring up additional icons/options by swiping in the row of the desired option. "Add" icons 690 can allow a user to add options to a selected filter category.

The screen 600 can provide a setup icon 692, which can take a user to a setup screen. In the setup screen, the user may be able to edit the categories and icons displayed on the screen 600, edit or add to a list of target devices (including registering a new target device), specify the location of an API or library useable to carry out a disambiguation method, or configure components (e.g., sensors, antennas, and the like) used in carrying out a target device registration or disambiguation process.

A permissions icon 694 can allow a user to manage permissions associated with target devices. For example, a user can provide information, such as a user name and password, to demonstrate that they are authorized to access a particular target device. The user may also choose to make target devices available to other users, but may restrict access to particular users or groups of users (e.g. a family, a workgroup or enterprise, those having particular credentials, or the public, generally). Permissions can be for a group of devices or for a single device, and may be for a limited duration (e.g., one-time use or use for a particular time period), or can be for continuous/ongoing use (optionally until revoked). A user may be able to access a library of target devices by selecting the library icon 696. By accessing the library, a user may be able to add or more target devices from the library, or edit properties or a profile associated with a target device.

Target Device Registration Method

Figure 7:
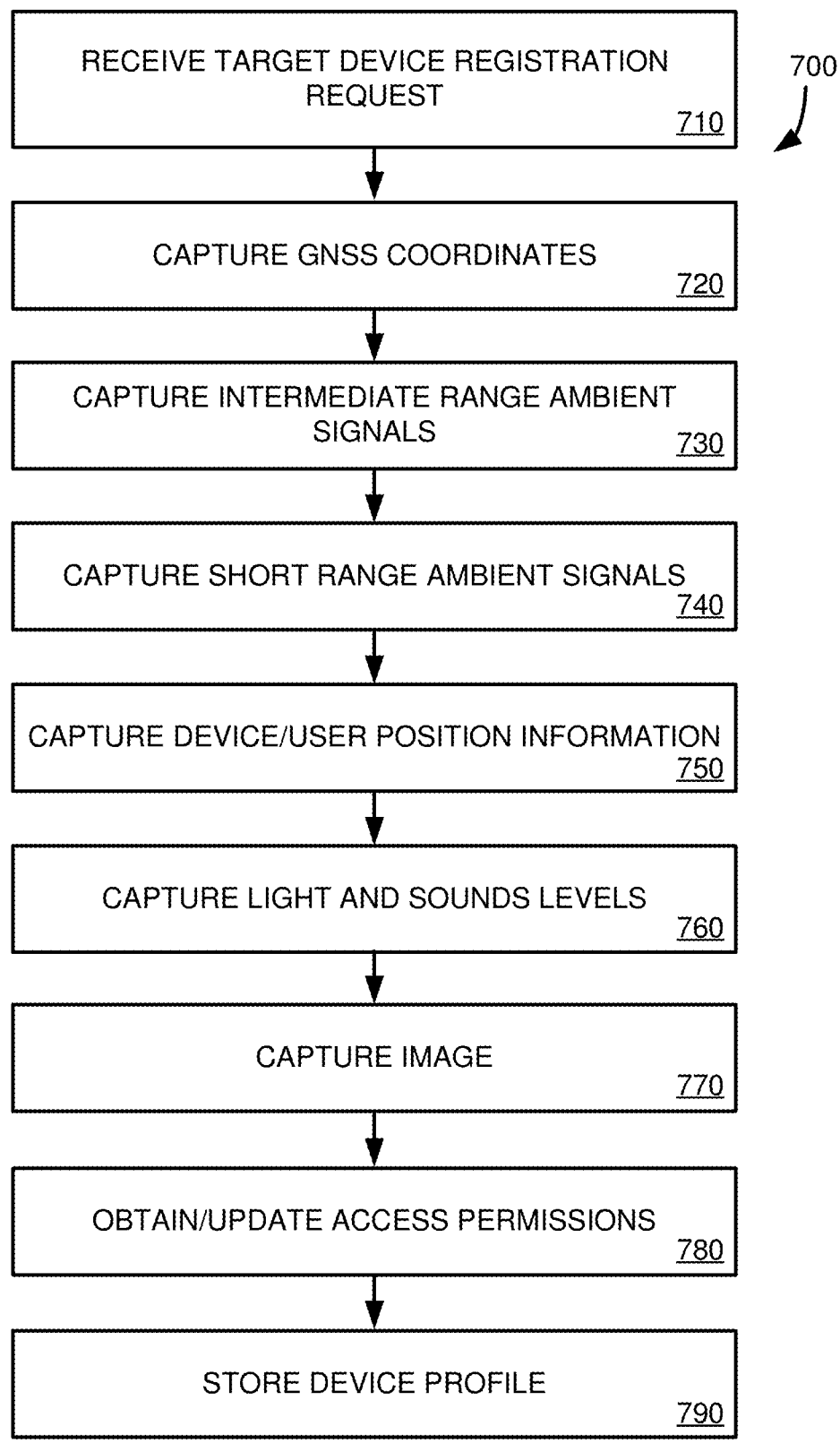
FIG. 7 is a flowchart of an example method for creating a target device profile that includes ambient signal data.

FIG. 7 illustrates a method 700 for registering a target device, such as storing ambient signals about the device in a library or database. The method 700 can be carried out using the architecture 500 of FIG. 5.

The 710, a request to register a target device is received. For example, the request can be received from an application through an API (e.g., a request from an application 588 to the API 552). In other examples, the request can received within (and the method 700 executed by) an application. The request can originate with a user, such as an end user. In other aspects, the request can be generated by a computing device, such as during an automated device registration process. In some cases, the method 700 can be carried out while the source device is stationary. In other cases, the method 700 can be carried out while the source device is in motion, or signals (or images) can be detected at multiple locations as part of the registration method 700.

At 720, GNSS coordinates of the source device are determined. At 730, intermediate range ambient signals, such as WAP signals or cellular data network signals, are detected and recorded. In at least some cases, along with an identifier of the WAP or cellular network, an associated signal strength can be measured and recorded.

At 740, devices using short range communication protocols (e.g., near field-communication or Bluetooth) are detected, optionally including their signal strength, and their information recorded. Positional information associated with the source device is determined and recorded at 750. For example, the direction the source device is facing (e.g., compass direction, or position about a vertical axis) and the tilt of the source device (e.g., position about a horizontal axis) can be detected. This positional information can be particularly useful when candidate target devices have been narrowed down to a relatively small area, or a relatively small number of devices. The tilt of the source device, for instance, may provide an indication of whether a user intends to connect to a desktop PC (lower height) or a wall mounted television or monitor (greater height).

At 760, ambient light and sound levels (and, optionally color information or sound pattern information) are detected. At 770, an image or photo, such as in the direction and tilt of the device, is recorded.

Optionally, at 780, permissions associated with the target device can be set. A device profile, which can include the photo obtained at 770 and signal information obtained at 720-760, can be stored at 790.

Other types of information can be stored in the device profile. For example, an identity or credentials of a user may be stored along with the profile. During a disambiguation method, the identity or credentials may be used to help narrow the list of candidate devices (e.g., certain devices may not have been previously registered by the user (including importing a profile from another user or a library), and thus may be considered at least initially as not candidate devices). Stored information can also include communication information useable to connect the source and target devices (e.g., a communication medium, protocol, or network) or device settings (e.g., audio volume or display options) for the source and/or target devices.

It should be appreciated that not all of the steps (and signals detected, or photos or images recorded) of method 700 need be carried out. In addition, the steps need not be carried out in the order depicted in FIG. 7, and described herein. In particular, the signals detected can depend on factors such as the capabilities of the source device, the level of disambiguation needed, and signals that are detectable in the registration environment. Regarding the level of disambiguation needed, in some cases, it may be relatively easy to distinguish between candidate target devices, such as if they are in locations distant from one another. In that event, GNSS data from step 720 may be sufficient to allow the correct target device to be determined. In other cases, there may be many different candidate target devices in an area, and more, or all, of the information acquisition steps depicted in FIG. 7 may be used in disambiguation.

A device profile can be periodically updated. For instance, in some cases, only a portion of available information may be stored in a target device profile. If disambiguation becomes more difficult, at least a portion of the registration process 700 can be carried out to add additional information to the target device profile. Similarly, the device profile can be updated, such as if there is a change in the ambient signals detectable at the target device (e.g., a change in detectable WAPs or a change in the appearance of the location of the target device).

In some cases, it may be desirable to store multiple device profiles, or multiple sets of signal information or images, for a target device. For example, the signals detectable at, and appearance of, the target device may change depending on the time of day or day of the week. Light intensity and color values may differ depending on whether the sun is up. Available networks or devices, or sound or light values, at the target device may be different on weekends than on weekdays. In some cases, a timestamp can be associated with a device profile, or set of signals or photos. When candidate target devices are to be disambiguated, a current time value can be provided that allows the most appropriate device profile, or set of signals or photos, to be used in the disambiguation process.

Disambiguation Method

Figure 8:
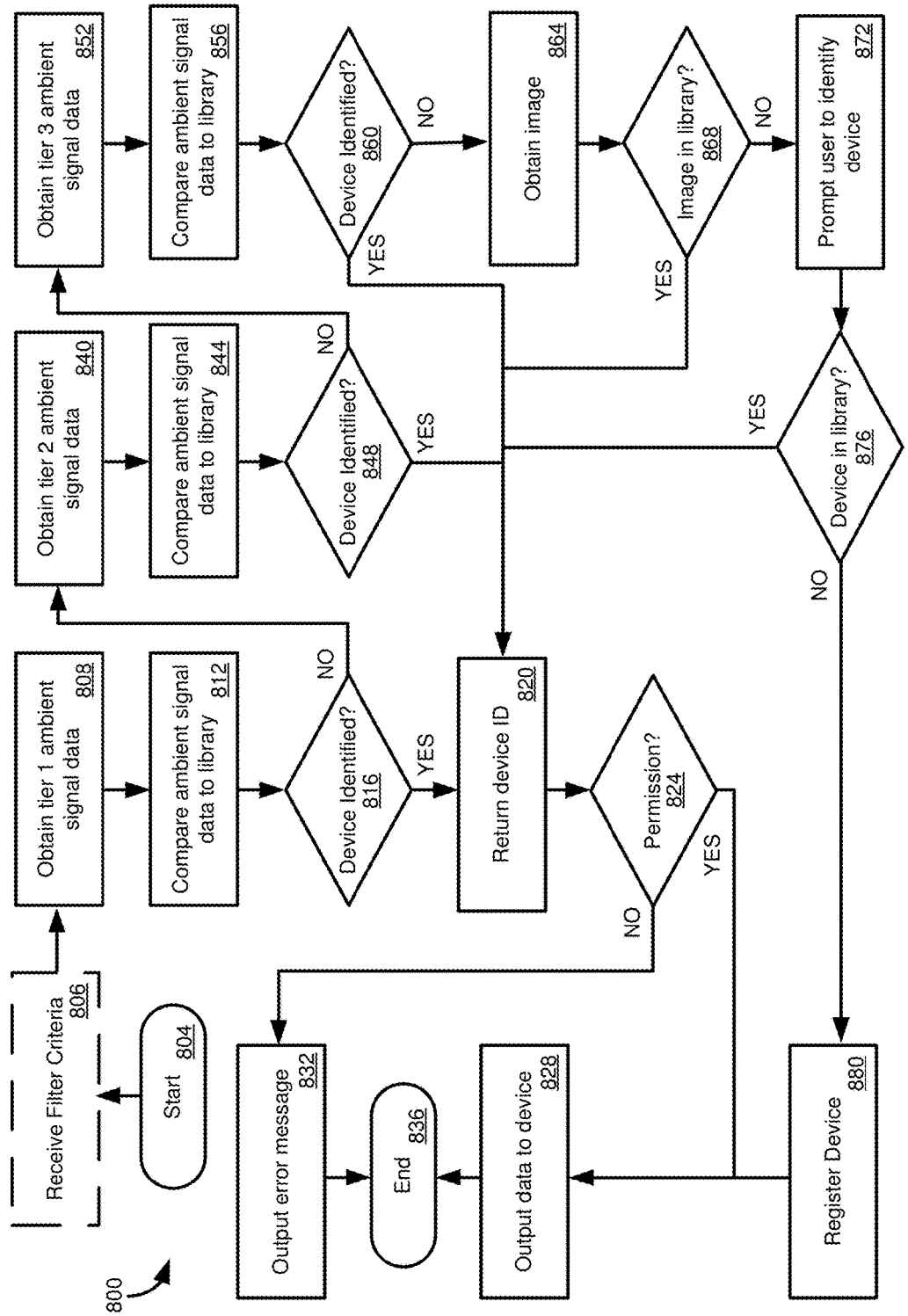
FIG. 8 is a flowchart of an example disambiguation method.

FIG. 8 illustrates a method 800 for disambiguating a plurality of candidate target devices to identify a target device to be connected with a source device. The method 800 can use the architecture 500 of FIG. 5, and can use target device profiles obtained using the method 700 of FIG. 7.

The method beings at 804. Optionally, at 806, filter criteria is received. Filter criteria can be received from, or be based on, one or more sources, such as a user or an application. For example, a user may specify a particular location (e.g., a general location, such as "home" or "office," or a more particular location therein, such as "bedroom" or "conference room) or a particular type of activity (e.g., "stream video," "play music"). Information received from an application may also specify filter criteria (including a location or activity type), or the method 800 can use the type of application as filter criteria (e.g., a video streaming application can be associated with filter criteria limiting candidate target devices to those capable of streaming video). Tier 1 ambient signal data is obtained at 808, such as by the source device. Tier 1 ambient signal data can be data most likely to be sufficient to return the identity of the target device. For example, a combination of GNSS coordinates and available WAPs may be sufficient to identify the intended target device. At 812, the tier 1 ambient signal data is compared with a library or database. Comparing ambient signal data to a library or database, generally (including at 812), can include determining whether identifiers, signal types, signal strengths, and directional information match information stored in target device profiles. For example, if a target device profile does not include a particular identifier included in the ambient signal data, the target device profile can be eliminated as a candidate. Correspondingly, if there is a match between the ambient signal data and a target device profile in the library, the associated target device can be maintained as a candidate.

Signal strengths of ambient signals can be used to select or eliminate target devices as candidates, and to help distinguish between candidates. For example, if two candidates both include an identifier of the ambient signal data, but one device profile records a signal strength that is only 5% different from the value in the ambient signal data, and the other device profile records a signal strength that is 65% different than the signal value, the target device associated with the 5% difference can be selected as the target device (or at least maintained as a candidate, and the other device eliminated). Similarly, if a signal is detected as coming from a direction that does not match a direction in a particular device profile, or is off by some amount, the associated device can be removed as a candidate, or the probability of it being the correct device lowered.

At 816, it is determined whether the target device can be identified, including being identified to a desired confidence level. For example, potential candidate target devices can first be selected based on GNSS coordinates (and/or WAP triangulation), and then ranked based on the presence of another ambient signal, including signal strength (corresponding to distance from), such as signals from one or more WAPs.

If the target device can be identified, a device identifier is returned (such as in response to an API call) at 820. Optionally, at 824, the method 800 can determine whether a user or process requesting the target device identifier has permission to access the target device. For example, the permission can be checked against a library. If access to the target device is permitted, data is output to the device at 828. If access is not permitted, an error message is output at 832. In either case, the method 800 ends at 836. Additional information can be returned at 820, such as settings for the source device or target device, including to facilitate a particular activity (e.g., video output/input/display settings) or communication between the source and target devices, such as identification of a communication medium, protocol, or network to use in sending and receiving data between the source and target devices.

If, at 816, the target device could not be identified, such as to a desired confidence level, tier 2 ambient signal data can be obtained or analyzed at 840. For example, if two profiles include an identifier in the ambient signal data, and one device has a recorded signal strength value that is 7% different than the ambient signal data and the other device has a recorded signal strength value that is 13% different, it may be determined that the devices cannot be satisfactorily distinguished based on the tier 1 data (such as to a desired confidence level), and thus additional ambient signal data, or other information, should be used to further disambiguate the devices.

Tier 2 ambient signal data can be data that, when added to the tier 1 ambient signal data, can be sufficient to identify the target device. Tier 2 ambient signal data can include orientation information (e.g., direction and tilt) of the source device and devices using short range communication protocols detectable by the source device.

The tier 2 ambient signal data (optionally combined with the tier 1 ambient signal data) is compared with the library or database at 844. At 848, it is determined whether the target device can be identified, such as to a desired degree of confidence. Steps 844 and 848 can be carried out in an analogous manner to steps 808 and 812. If the target device can be identified, the method proceeds to 820. If the target device cannot be identified, the method 800 proceeds to 852.

At 852, tier 3 ambient signal data is obtained or analyzed. Tier 3 ambient signal data can be data that, by itself, may not be sufficient to identify a target device, but may aid in device identification when combined with tier 1 and/or tier 2 ambient signal data. Tier 3 ambient signal data can include light and sound signals detectable at the source device.

At 856, the tier 3 ambient signal data, and optionally tier 1 and/or tier 2 ambient signal data, are compared with the library or database (for example, eliminating or ranking candidate target devices based on the presence or absence of light intensity values or sound frequencies and amplitudes in a target device profile versus the ambient signal data, or differences between the ambient signal data and the values recorded in a target device profile). At 860, it is determined whether the target device can be identified, such as to a desired confidence level. If the target device can be identified, the method 800 proceeds to 820. If the target device cannot be identified, the method 800 proceeds to 864.

At 864, an image of the environment of the source device is obtained, such as using a camera of the source device. At 868, image analysis techniques can be applied to the image to determine whether the image matches an image in a library. For example, an image recognition component (e.g., in communication with the API 552 of FIG. 5) can employ various image recognition techniques, including machine learning based techniques. The machine learning software component can employ any suitable machine learning technique useable in image recognition. Suitable machine learning techniques include decision trees, artificial neural networks, instance-based learning, Bayesian methods, reinforcement learning, inductive logic programming, genetic algorithms, support vector machines, or combinations thereof. However, non-machine learning based techniques can also be used. If the image is identified (including features thereof, and identification of the image, or features thereof (e.g., an outline of a putative target device), to a desired confidence level), the method 800 can proceed to 820.

If the image cannot be identified, in at least some cases, the method 800 can proceed to 872, where a user is prompted to identify the target device, such as by providing the user with the most likely candidate target devices and having the user select the correct target device. If, at 876, the device has been identified in the library, the method can proceed to 820. If the device cannot be identified in the library, a user can be prompted to register the device at 880 (such as using the method 700 of FIG. 7). The method can then proceed to 828.

Variations can be made to the method 800 without departing from the scope of the present disclosure. For example, although three tiers of ambient signal data are shown, more or fewer tiers can be used. For example, a single tier can be used, where all possible or available types of ambient signals are analyzed in a single step, or single types of ambient signals can be analyzed sequentially until a target device is identified, such as to a desired degree of confidence. In some cases, image analysis can be included in the analysis of ambient signals, rather than being used if the ambient signals are not sufficient to identify a target device. Or, the image analysis can be omitted. In a particular example, if a target device cannot be identified after ambient signals have been analyzed, the method can proceed to 880. In addition, steps can be carried out in a different order. For example, receiving filter criteria at 806 can occur after receiving one or more types of ambient signal data, or at other times during the process 800.

Although the method 800 includes various steps (e.g., 812, 844, 856) comparing ambient signal data to a library, the method can carry out other processing using the data to help determine the location of the source device and the identity of the intended target device. For example, the steps 812, 844, 856 can include processes such as triangulating the location of the source device using ambient signal data (e.g., data from multiple WAPs), or analyzing combinations of data, such as using WAP data to refine a location provided by GNSS data.

The method 800 can include additional steps. For example, in some cases the target device selected using the method 800 may not be the intended target device. In such cases, the correct device can be selected (such as by user correction). This feedback can be used in a learning process (including, in some cases, in machine learning algorithms) to help train the process 800 to more accurately select the intended target device. The feedback can be used, in particular examples, to adjust a weighting scheme or assign confidence values.

Example Use Scenarios

In one example use scenario, consider a user that has a smart television and a desktop computer with a monitor in a room of the user's home. The television and monitor can be target devices that can be connected to a mobile phone, which can serve as a source device. As an initial setup procedure, the user registers each target device using the phone, which detects ambient signals and creates a device profile for each target device, including recording an image of the surroundings of the device and associating the image with the device profile. In some cases, the user can connect with the target devices, which can be used to associate a communication protocol with the device profile. For example, the user can connect to the smart television and monitor using a display sharing protocol (e.g., the Remote Desktop Protocol of Microsoft Corp., of Redmond, Wash.) and/or another communication protocol (e.g., Bluetooth). Identifiers for these protocols are saved in the device profiles of the television and monitor.

Later, after setup is complete, the user can walk into the room with the user's phone and easily connect to one of the devices. In a first example, the user wants to play a video on the smart television. The user enters the room, faces the smart television with the user's phone, and initiates video playback. Assume that location of the user's phone is determined via GPS as being in the room (a first ambient signal) and that the direction of the user's phone is determined via the phone's compass (a second ambient signal) as pointing in the direction of the smart television. In this first example, the user's phone can automatically connect to the smart television based on the ambient signals (e.g., along with comparison to the smart television profile) and automatically start playing the video on the smart television.

In a second example, the user wants to display a photo on the desktop computer monitor. The user enters the room, faces the desktop computer, and selects a photo for display. Assume that in this example the user's phone can be located in the room (e.g., via GPS and/or other ambient signals), but that the direction the user's phone is facing cannot be determined, or is not sufficient to disambiguate the monitor from the television. In this case, the user's phone takes a picture in the direction the user is facing (the desktop computer and surrounding area). Based on comparison to the desktop computer profile, the target device is automatically determined and the photo is automatically displayed at the desktop computer.

Computing Systems

Figure 9:
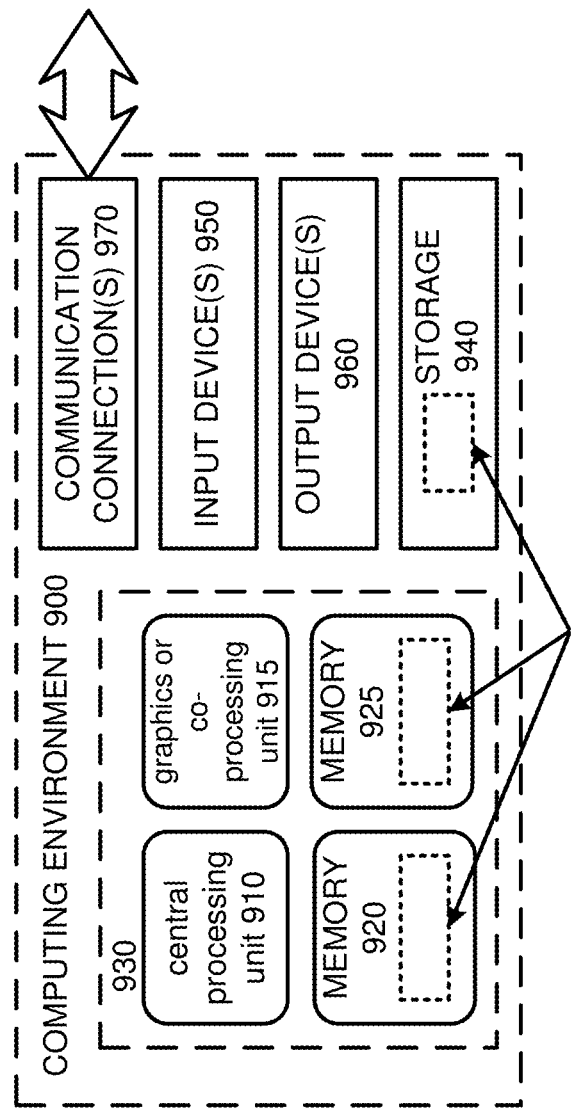
FIG. 9 is a diagram of an example computing system in which some described embodiments can be implemented.

FIG. 9 depicts a generalized example of a suitable computing system 900 in which the described innovations may be implemented. The computing system 900 is not intended to suggest any limitation as to scope of use or functionality, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown, e.g., operating system 504 of FIG. 5) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information and which can be accessed within the computing system 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. For video encoding, the input device(s) 950 may be a camera, video card, TV tuner card, or similar device that accepts video input in analog or digital form, or a CD-ROM or CD-RW that reads video samples into the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 10:
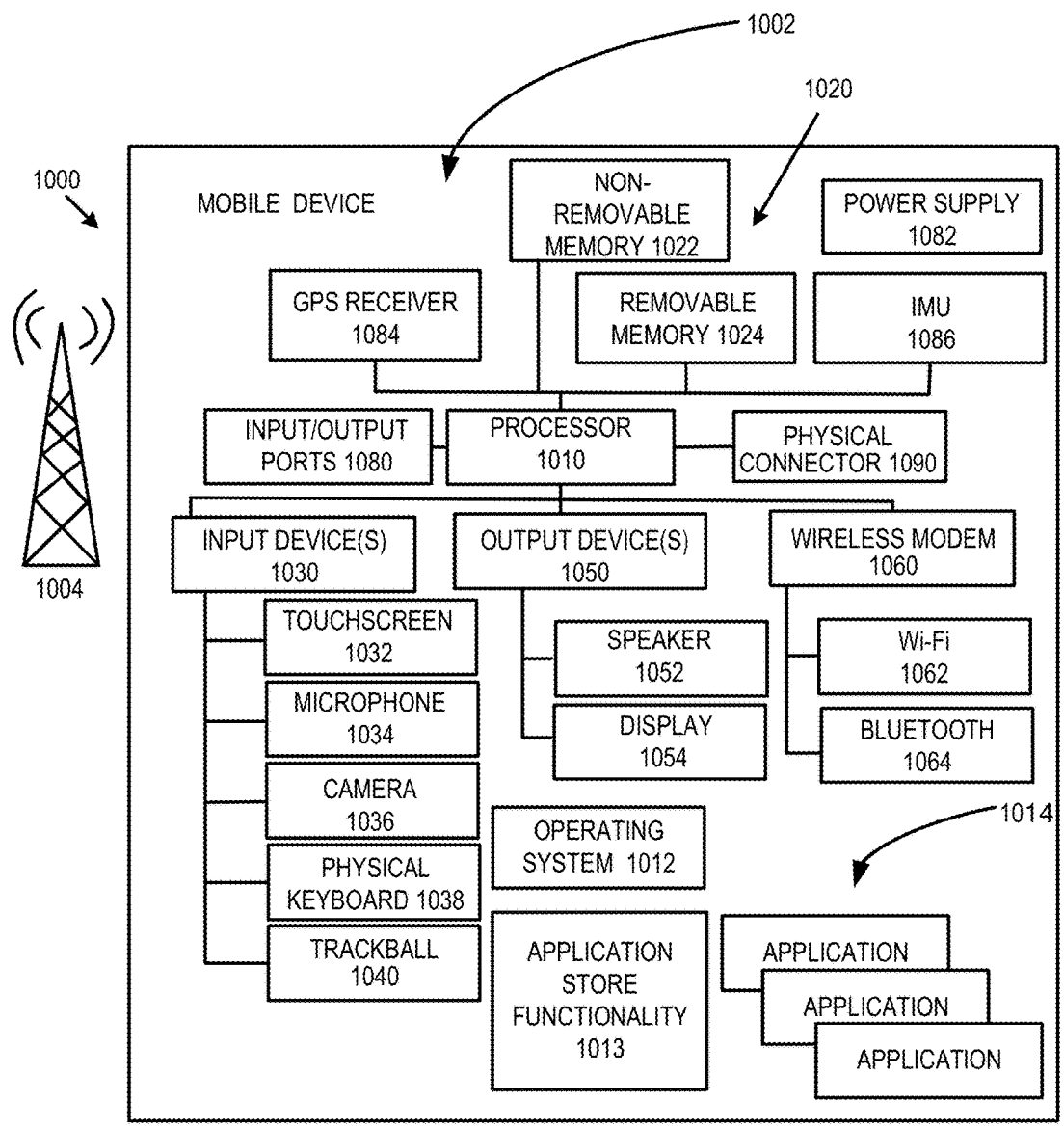
FIG. 10 is an example mobile device that can be used in conjunction with the technologies described herein.

FIG. 10 is a system diagram depicting an example mobile device 1000 including a variety of optional hardware and software components, shown generally at 1002. Any components 1002 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 1004, such as a cellular, satellite, or other network. The mobile device 1000 can represent a source device (e.g., source device 502 of FIG. 5).

The illustrated mobile device 1000 can include a controller or processor 1010 (e.g., signal processor, microprocessor, ASIC, or other control and processing logic circuitry) for performing such tasks as signal coding, data processing, input/output processing, power control, and/or other functions. An operating system 1012 (e.g., operating system 504 of FIG. 5) can control the allocation and usage of the components 1002 and support for one or more application programs 1014. The application programs can include common mobile computing applications (e.g., email applications, calendars, contact managers, web browsers, messaging applications), or any other computing application. Functionality 1013 for accessing an application store can also be used for acquiring and updating application programs 1014.

The illustrated mobile device 1000 can include memory 1020. Memory 1020 can include non-removable memory 1022 and/or removable memory 1024. The non-removable memory 1022 can include RAM, ROM, flash memory, a hard disk, or other well-known memory storage technologies. The removable memory 1024 can include flash memory or a Subscriber Identity Module (SIM) card, which is well known in GSM communication systems, or other well-known memory storage technologies, such as "smart cards." The memory 1020 can be used for storing data and/or code for running the operating system 1012 and the applications 1014. Example data can include web pages, text, images, sound files, video data, or other data sets to be sent to and/or received from one or more network servers or other devices via one or more wired or wireless networks. The memory 1020 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1000 can support one or more input devices 1030, such as a touchscreen 1032, microphone 1034, camera 1036, physical keyboard 1038 and/or trackball 1040 and one or more output devices 1050, such as a speaker 1052 and a display 1054. Other possible output devices (not shown) can include piezoelectric or other haptic output devices. Some devices can serve more than one input/output function. For example, touchscreen 1032 and display 1054 can be combined in a single input/output device.

The input devices 1030 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1012 or applications 1014 can comprise speech-recognition software as part of a voice user interface that allows a user to operate the device 1000 via voice commands. Further, the device 1000 can comprise input devices and software that allows for user interaction via a user's spatial gestures, such as detecting and interpreting gestures to provide input to a gaming application.

A wireless modem 1060 can be coupled to an antenna (not shown) and can support two-way communications between the processor 1010 and external devices, as is well understood in the art. The modem 1060 is shown generically and can include a cellular modem for communicating with the mobile communication network 1004 and/or other radio-based modems (e.g., Bluetooth 1064 or Wi-Fi 1062). The wireless modem 1060 is typically configured for communication with one or more cellular networks, such as a GSM network for data and voice communications within a single cellular network, between cellular networks, or between the mobile device and a public switched telephone network (PSTN).

The mobile device can further include at least one input/output port 1080, a power supply 1082, a satellite navigation system receiver 1084, such as a Global Positioning System (GPS) receiver, an inertial measurement unit (IMU) 1086 (or one or more components thereof, such as a magnetometer, an accelerometer, or a gyroscope, or similar types of sensors), and/or a physical connector 1090, which can be a USB port, IEEE 1394 (FireWire) port, and/or RS-232 port. The illustrated components 1002 are not required or all-inclusive, as any components can be deleted and other components can be added.

Cloud-Supported Environment

Figure 11:
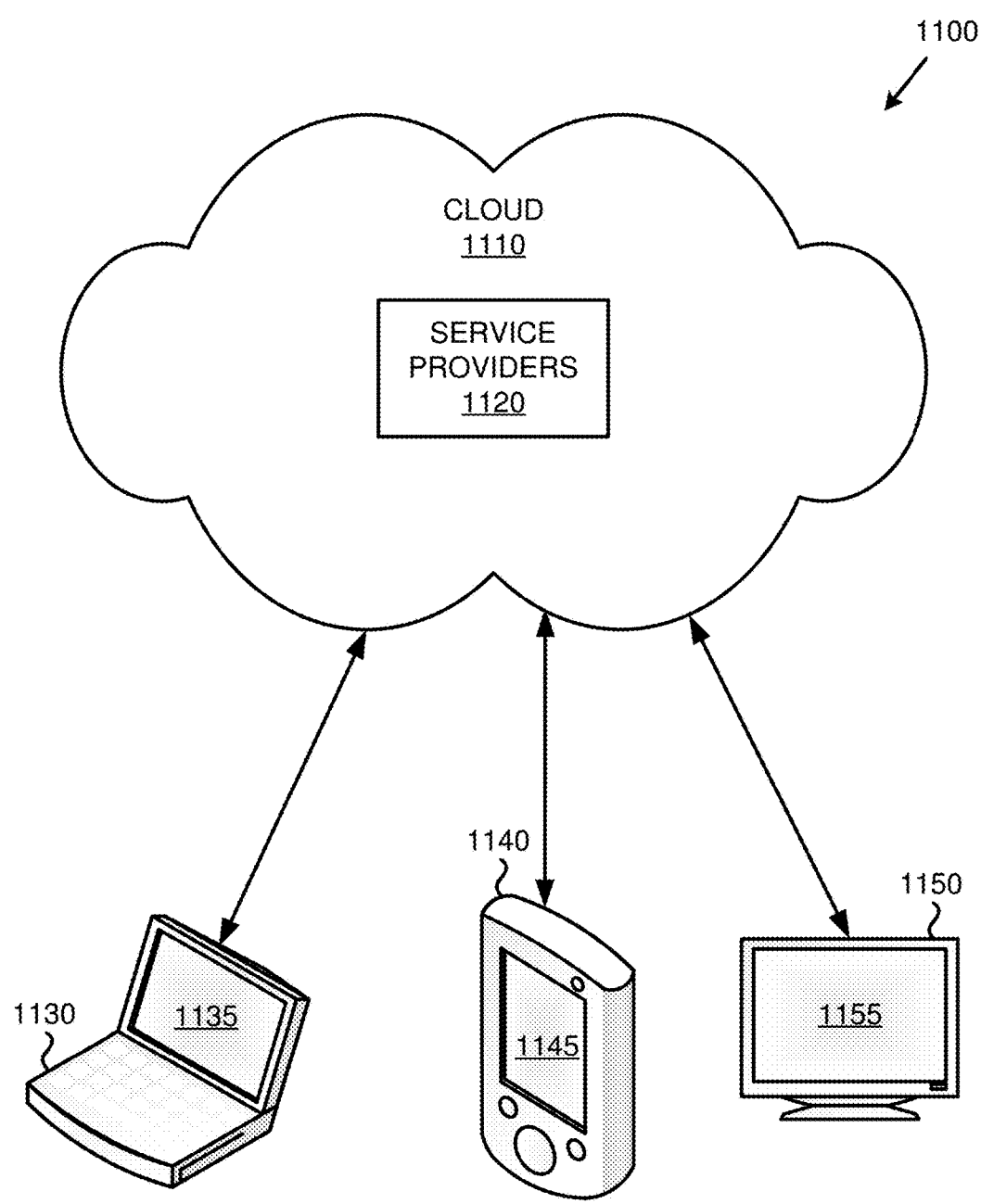
FIG. 11 is an example cloud-support environment that can be used in conjunction with the technologies described herein.

FIG. 11 illustrates a generalized example of a suitable cloud-supported environment 1100 in which described embodiments, techniques, and technologies may be implemented. In the example environment 1100, various types of services (e.g., computing services) are provided by a cloud 1110 (e.g., network 584 of FIG. 5). For example, the cloud 1110 can comprise a collection of computing devices, which may be located centrally or distributed, that provide cloud-based services to various types of users and devices connected via a network such as the Internet. The implementation environment 1100 can be used in different ways to accomplish computing tasks. For example, some tasks (e.g., processing user input and presenting a user interface) can be performed on local computing devices (e.g., connected devices 1130, 1140, 1150) while other tasks (e.g., storage of data to be used in subsequent processing) can be performed in the cloud 1110.

In example environment 1100, the cloud 1110 provides services for connected devices 1130, 1140, 1150 with a variety of screen capabilities. Connected device 1130 represents a device with a computer screen 1135 (e.g., a mid-size screen). For example, connected device 1130 could be a personal computer such as desktop computer, laptop, notebook, netbook, or the like. Connected device 1140 represents a device with a mobile device screen 1145 (e.g., a small size screen). For example, connected device 1140 could be a mobile phone, smart phone, personal digital assistant, tablet computer, and the like. A connected device 1140 can be, for example, a source device.

Connected device 1150 represents a device with a large screen 1155. For example, connected device 1150 could be a television screen (e.g., a smart television) or another device connected to a television (e.g., a set-top box or game console) or the like. A connected device 1150 can be, for example, a target device.

One or more of the connected devices 1130, 1140, 1150 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1100. For example, the cloud 1110 can provide services for one or more computers (e.g., server computers) without displays.

Services can be provided by the cloud 1110 through service providers 1120, or through other providers of online services (not depicted). For example, cloud services can be customized to the screen size, display capability, and/or touchscreen capability of a particular connected device (e.g., connected devices 1130, 1140, 1150).

In example environment 1100, the cloud 1110 provides the technologies and solutions described herein to the various connected devices 1130, 1140, 1150 using, at least in part, the service providers 1120. For example, the service providers 1120 can provide a centralized solution for various cloud-based services. The service providers 1120 can manage service subscriptions for users and/or devices (e.g., for the connected devices 1130, 1140, 1150 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 9, computer-readable storage media include memory 920 and 925, and storage 940. By way of example and with reference to FIG. 9, computer-readable storage media include memory and storage 920, 922, and 924. The term computer-readable storage media does not include signals and carrier waves. In addition, the term computer-readable storage media does not include communication connections, such as 970, 960, 962, and 964.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device comprising:
a processing unit; and
memory;
the computing device configured, via computer-executable instructions, to perform operations for determining the identity of a target device to connect with a source device, the operations comprising:
receiving a request for an identifier of a target device to which a source device is to connect;
receiving data describing at least one ambient signal detected by the source device, wherein the at least one ambient signal is not used to send data between the source device and the target device;
comparing the data describing the at least one ambient signal with a plurality of target device profiles;
determining that the data matches a target device profile of the plurality of target device profiles corresponding to the target device; and
returning an identifier associated with the target device and the determined target device profile.

2. The computing device of claim 1, the operations further comprising:
determining that the data does not match a target device profile of the plurality of target device profiles;
determining a device profile for the target device; and
storing the device profile for the target device with the plurality of target device profiles.

3. The computing device of claim 1, wherein receiving data describing at least one ambient signal comprises receiving data describing a plurality of signals detected by the source device, and wherein comparing the data describing the at least one ambient device signal with a plurality of target device profiles comprises comparing the data describing a plurality of signals detected by the source device with the plurality of target device profiles.

4. The computing device of claim 1, wherein at least a portion of the target device profiles comprises at least one ambient signal identifier useable to select the target device associated with a profile as the target device to which the source device is to output data.

5. The computing device of claim 4, wherein the at least one ambient signal identifier is associated with a signal intensity value also stored in the corresponding target device profile.

6. The computing device of claim 1, wherein at least a portion of the target device profiles comprise an image of an environment in which the respective target device is used.

7. The computing device of claim 1, the operations further comprising
receiving an image acquired by the source device contemporaneously with the request; and
analyzing the image to determine whether the image matches one or more stored images associated with the plurality of target device profiles.

8. The computing device of claim 1, wherein the receiving and comparing further comprise:
receiving data describing a first set of ambient signals detected by the source device;
comparing data describing the first set of ambient signals with the plurality of target device profiles;
receiving data describing a second set of ambient signals detected by the source device; and
comparing the data describing the second set of ambient signals with at least a portion of the plurality of target device profiles.

9. The computing device of claim 8, wherein the receiving and comparing of the data describing the second set of ambient signals is carried out when the target device cannot be disambiguated among the target device profiles based on the first set of ambient signals.

10. The computing device of claim 1, wherein the data describing at least one ambient signal comprises GNSS coordinates.

11. The computing device of claim 1, wherein the data describing at least one ambient signal comprises a plurality of wireless access point identifiers.

12. The computing device of claim 1, wherein the data describing at least one ambient signal comprises a plurality of wireless device identifiers.

13. The computing device of claim 1, wherein the data describing at least one ambient signal comprises a plurality of Bluetooth device identifiers.

14. The computing device of claim 1, wherein the data describing at least one ambient signal comprises data describing the position or tilt of the source device.

15. The computing device of claim 1, wherein the data describing at least one ambient signal comprises data describing the ambient lighting or sound profile about the source device.

16. The computing device of claim 1, wherein the data describing at least one ambient signal comprises data describing at least one member of a plurality of the following categories:
global navigation satellite system coordinates;
wireless access points identifiers and signal strengths or cellular network identifiers and signal strengths;
wireless device identifiers or Bluetooth device identifiers;
data describing the position or tilt of the source device; and
data describing the ambient lighting or sound profile about the source device.

17. The computing device of claim 16, wherein the data describing at least one ambient signal comprises data describing at least one member of at least three of the categories.

18. The computing device of claim 16, wherein the comparing and determining is carried out at the source device.

19. A computer-readable storage medium storing computer-executable instructions for execution on a computing device to perform operations for determining the identity of a target device to connect with a source device, the operations comprising:

receiving a request for an identifier of a target device to which a source device is to connect;

receiving data describing at least one ambient signal detected by the source device, wherein the at least one ambient signal is not used to send data between the source device and the target device;

comparing the data describing the at least one ambient signal with a plurality of target device profiles;

determining that the data matches a target device profile of the plurality of target device profiles corresponding to the target device; and returning an identifier associated with the target device and the determined target device profile.

20. A method, implemented by a computing device, for determining the identity of a target device to connect with a source device, the method comprising:

receiving a request for an identifier of a target device to which a source device is to connect;

receiving data describing at least one ambient signal detected by the source device, wherein the at least one ambient signal is not used to send data between the source device and the target device;

comparing the data describing the at least one ambient signal with a plurality of target device profiles;

determining that the data matches a target device profile of the plurality of target device profiles corresponding to the target device; and returning an identifier associated with the target device and the determined target device profile.

* * * * *